US009674336B2

(12) United States Patent
Yaghmour

(10) Patent No.: US 9,674,336 B2
(45) Date of Patent: Jun. 6, 2017

(54) PORTABLE PROCESSING UNIT ADD ON FOR MOBILE DEVICES

(71) Applicant: Karim Jean Yaghmour, Sherbrooke (CA)

(72) Inventor: Karim Jean Yaghmour, Sherbrooke (CA)

( * ) Notice: Subject to any disclaimer, the term of this patent is extended or adjusted under 35 U.S.C. 154(b) by 0 days.

(21) Appl. No.: 14/519,101

(22) Filed: Oct. 20, 2014

(65) Prior Publication Data

US 2015/0111612 A1    Apr. 23, 2015

Related U.S. Application Data

(60) Provisional application No. 61/893,236, filed on Oct. 20, 2013.

(51) Int. Cl.
*H04B 1/38* (2015.01)
*H04M 1/725* (2006.01)
*G06F 1/16* (2006.01)

(52) U.S. Cl.
CPC ...... *H04M 1/72575* (2013.01); *G06F 1/1632* (2013.01); *G06F 1/1669* (2013.01)

(58) Field of Classification Search
CPC . G06F 3/0227; G06F 3/0233; H04M 1/72575
USPC ........................................ 455/557
See application file for complete search history.

(56) References Cited

U.S. PATENT DOCUMENTS

| | | | |
|---|---|---|---|
| 4,853,682 A | 8/1989 | Asano et al. | |
| 6,594,142 B2 * | 7/2003 | Katz | G06F 1/1626 341/22 |
| 6,894,626 B2 * | 5/2005 | Olodort | G06F 3/0221 341/22 |
| 7,054,965 B2 | 5/2006 | Bell et al. | |
| D524,809 S | 7/2006 | Alcouloumre et al. | |
| 7,231,481 B2 | 6/2007 | Scott et al. | |
| 7,285,021 B2 | 10/2007 | Bell et al. | |
| 7,537,485 B2 | 5/2009 | Bell et al. | |
| 7,540,675 B2 * | 6/2009 | Liu | G06F 3/0221 400/472 |
| 7,904,628 B2 | 3/2011 | Groesch | |

(Continued)

FOREIGN PATENT DOCUMENTS

CN    103631734    3/2014
WO    2012083484    6/2012

OTHER PUBLICATIONS

Asano et al., "Development of Wrist Computer System", Journal of The Horological Institute of Japan, No. 110, Sep. 25, 1984, pp. 48-72. Retrieved from "http://ci.nii.ac.jp/naid/110002776184/en" on Apr. 10, 2016.

*Primary Examiner* — Nader Bolourchi

(57) ABSTRACT

The present disclosure provides a portable processing unit add-on computing device for mobile devices. In one embodiment, the portable processing unit add-on comprises one or more processors, memory and means for remotely displaying and receiving input for its user interface. The portable processing unit add-on interacts with the mobile device in order to allow the mobile device's user to access the portable processing unit's functionality. The portable processing unit typically, but not necessarily, includes a desktop-grade processor, such as one based on the Intel™ x86 architecture, and runs a desktop-grade operating system such as Microsoft Windows™ or Ubuntu Linux™.

21 Claims, 8 Drawing Sheets

(56) References Cited

U.S. PATENT DOCUMENTS

| | | | |
|---|---|---|---|
| D640,694 S | 6/2011 | Matias | |
| 8,224,406 B2* | 7/2012 | Champion | G06F 1/16 361/679.09 |
| 8,405,603 B2 | 3/2013 | Kelley et al. | |
| 8,738,080 B2 | 5/2014 | Nhiayi | |
| 8,798,650 B2* | 8/2014 | Koraichi | H04B 1/3816 455/418 |
| 8,990,469 B2 | 3/2015 | Benhard et al. | |
| 2004/0019724 A1 | 1/2004 | Charles et al. | |
| 2007/0049355 A1* | 3/2007 | Wu | G06F 3/0221 455/575.1 |
| 2007/0094435 A1 | 4/2007 | Fry et al. | |
| 2008/0259552 A1 | 10/2008 | Calvarese | |
| 2009/0013171 A1 | 1/2009 | Gilling | |
| 2009/0309886 A1 | 12/2009 | Sneed | |
| 2013/0033807 A1* | 2/2013 | Kim | G06F 1/1669 361/679.01 |
| 2013/0297844 A1 | 11/2013 | Rosenberg et al. | |
| 2013/0326104 A1* | 12/2013 | Strommen | G06F 1/1632 710/304 |

* cited by examiner (a)                 (b)                 (c)

PORTABLE PROCESSING UNIT ADD ON FOR MOBILE DEVICES

This application is related to U.S. Application No. 61/893,236, titled "Portable Processing Unit Add-On for Mobile Devices", filed on Oct. 20, 2013, the entire contents of which are incorporated herein by reference.

FIELD OF INVENTION

The present disclosure relates generally to electronic devices and, more particularly, to mobile devices.

BACKGROUND

Modern ("smart") mobile devices have become pervasive. At the time of this writing, mobile phones and tablets have come to occupy a large part of peoples' daily lives. iPhones, iPads, Google Nexus devices, Samsung's Galaxy line of products, Motorola's Android phones, etc. are everywhere and more mobile devices are making their way into the market such as so-called "smart-watches". In many cases these devices have in fact replaced traditional desktops (i.e. Personal Computers (PCs)) as the predominant computing devices of the day.

Yet, the majority of mobile devices on the market suffer from a number of major drawbacks. Some of those drawbacks are a problem to the mobile device's direct user, while others are a problem to the companies and organizations, and more specifically the Information Technology (IT) departments which manage the infrastructure of said companies and organizations, where the user brings his device to or uses his device for work (i.e. the bring-your-own-device (BYOD) trend.)

First and foremost, one of the major drawbacks of mobile devices to users and the companies and/or organizations they may belong to is that said mobile devices represent a technological shift that breaks with existing usage paradigms, habits and corresponding investments and expenditures. Namely, mobile devices don't run traditional desktop operating systems such as Microsoft Windows™ and have varying degrees of difficulty of being connected with and making use of the capabilities provided by, to or for such desktop operating systems (OSes). As such, much of the functionality provided to both users and the organizations they belong to on desktop systems isn't available and/or can't be made available or readily possible on current mobile devices, or can only be made available with severe limitations.

Among many other issues, for example, it's increasingly common wisdom that mobile devices are great for consuming content, media and data but not so great for creating content, media and data, a task to which desktops have been historically well-adapted. This is partly due to the hardware limitations of mobile devices, who are primarily touch-based or motion-based, but is also reflected in the user-interfaces built for such devices which assume that the only pointing device available is one that has very limited precision: human fingers touching the screen or waving at the device using gestures. Desktops on the other hand typically have hardware more adapted for high volumes of input and interfaces that assume a fairly precise pointing device: the desktop mouse.

Another effect of the technological shift to touch-based devices is the disappearance of the keyboard as the primary input device. While some early smartphones came equipped with real physical keyboards, fewer and fewer devices actually sport them, the device vendors assuming that the market is no longer asking for such a feature. Some users, however, continue to look for this kind of input and resort to purchasing add-on keyboards for their mobile devices. In the case of phones, such keyboards can be made to snap onto the bodies of the mobile phone and slide out when needed, the addition doubling as a protective casing for the phone. In the case of tablets, such keyboards can be made to be encased into or attached to the clamshell/folded sleeves used to protect and carry the tablet.

Another example where mobile devices cause breakage with traditional desktops is in the software Application Programming Interfaces (APIs). The two predominant mobile OSes at the time of this writing, namely iOS™ and Android™, make no effort whatsoever to provide backward compatibility to the plethora of software that was developed for traditional desktops OSes such as the widely-used Windows™ OS or niche OSes such as Linux™ or Mac™ OS. Hence, there's typically no way to use traditional desktop applications on mobile devices without using some form of remote desktop functionality where said application is running remotely on a desktop, whether it be a real, physical one or a virtual machine.

Even a remote desktop capability brings with it its own set of issues. Primarily, it assumes the availability of a reliable and fast-enough data connection for the mobile device. While wireless networks are increasingly available, they aren't always available and they can sometimes suffer outages. And in the case of data access provided by mobile network operators through their mobile networks, such access can be very expensive. Also, most remote desktop capabilities assume the user is at least somewhat technically-savvy enough to be able to configure network addresses and deal with protocol-specific issues in order to make good use of his remote desktop. Either way, the user remains physically distant from the actual desktop system and can't readily connect any peripherals to the remote desktop. Instead, he has to make do with the limited functionality made available to him remotely.

One significant issue with the use of user-supplied mobile devices in a corporate environments is security. Indeed, IT departments face an uphill battle in ensuring the mobile devices brought to work by their users don't actually compromise the security of the existing infrastructure. This generally is a challenge because the mobile device OSes weren't designed with strong data segmentation in mind. Hence, there is always the potential for private, confidential and proprietary information to leak by way of the user's use of malicious or ill-conceived software that's running on his or her device. Various products have been put forth to solve this problem on mobile devices obviously. However, this is a problem that had known, well-accepted and well understood solutions in the day where organizations provided their users with desktop-based systems that had been properly configured and/or prepared by the IT department. Such configuration and preparation is practically impossible in the world of modern mobile devices. This is due in part to the fact that contrary to the desktop world where users can install their own OSes from scratch on laptops and workstations, mobile OSes come "burned in" from factory on mobile devices. Also, contrary to the desktop world where OS and core OS component updates are frequent, mobile device vendors have little to no incentive to update the system software running on their devices since their incentive is to sell new devices. Security, especially from the corporate perspective, remains therefore largely an unsolved issue with mobile devices.

Even without the corporate and security aspects, there are several downsides with the mobile devices in the mainstream market. First, as mentioned earlier, users remain locked by their vendors to a specific operating system software version that offers little to no upgrade path. In essence, the vendors' incentive is to sell newer devices, not upgrade old ones. Second, the level of control users have on their devices is fairly limited. In fact, most vendors, or the network operators selling the devices to a user, lock said devices down for a variety of reasons, thereby severely limiting the user's ability to truly control or modify the actions of the software running on his device. Therefore, if the user wants to get additional functionality, its assumed he'll have to purchase a brand new device.

Another issue faced by some users is the disappearance of ultra-portable desktop-grade computers. Whereas a few years ago, models such as the OQO™ or the Sony's™ ultra-portable Micro-PCs were available, these have been largely sidelined given the emergence of powerful mobile devices. Yet, some users still have a need for such PC-like devices on the go.

Separately from the issues of modern mobile devices. Users have other needs which remain unsolved by current offerings, either in software or hardware. Two specific ones of interest are password management and portable storage.

With regards to password management, users increasingly have to remember a larger and larger number of passwords for accessing a variety of different services and offerings. There are some password management apps on mobile devices. However, such apps assume that the OS that's running on the device is secure, which in and of itself is a flawed assumption given that, as mentioned above, most mobile devices' OSes are never updated. Hence, there's always the potential for passwords to be compromised if the data is stored on a mobile device. Some people resort to actually writing their passwords on bits of paper that they keep in their wallets. Obviously this has a number of drawbacks. If nothing else, theft or loss of the wallet with the clear-text passwords would result in an immediate threat to the security of the services and/or systems protected by said passwords.

With regards to portable storage, most mobile devices have a limited amount of storage. In addition, the storage used in such devices is solid-state storage such as embedded Multi-Media Card (eMMC) chips, Secure Digital (SD) cards and/or NOR or NAND flash that isn't geared for intensive usage. All such devices have a limited number of erase cycles and, therefore, writing to such devices must be limited in order to avoid wearing the storage prematurely, thereby rendering it inoperable. For this, and many of the reasons above, users must continue to carry a conventional laptop to use as their main work environment.

There is therefore a need for providing desktop functionality to mobile device users.

There is therefore also a need to provide keyboards to mobile devices.

There is thus a need to provide means for running unmodified desktop applications in conjunction with mobile devices.

There is therefore a need to provide desktop functionality to mobile devices that doesn't require access to large-scale mobile or wireless networks. There is thus also the need to make such access as easy as possible.

There is therefore additionally a need for providing a desktop-like environment for mobile devices that can be configured, customized and/or secured by the IT department which manages the infrastructure belonging to the organization for which the user works.

There is thus also a need to provide device-agnostic and software-version-agnostic functionality which the user can upgrade and maintain separately from his mobile device.

There is therefore further a need to provide PC-like functionality in an ultra-portable form-factor.

There is thus additionally a need to provide means for users to store, manage and access their passwords securely.

There is thus further a need for providing users with a means for having access to and the ability to process large amounts of information that doesn't necessarily depend on the use of solid-state storage.

SUMMARY OF THE INVENTION

An object of the present disclosure is to provide a portable processing unit add-on for mobile devices that overcomes at least one of the previously-listed drawbacks and that satisfy at least one of the above-mentioned needs.

Another object of the present disclosure is to provide a portable processing unit add-on for mobile devices that doesn't require any OS or hardware modifications on the mobile device in order to interface with it.

Another object of the present disclosure is to provide a portable processing unit add-on for mobile devices that provides desktop functionality to mobile device users.

Another object of the present disclosure is to provide a portable processing unit add-on for mobile devices that provides a keyboard to mobile devices.

Another object of the present disclosure is to provide a portable processing unit add-on for mobile devices that provides means for running unmodified desktop applications in conjunction with mobile devices.

Another object of the present disclosure is to provide a portable processing unit add-on for mobile devices that provides desktop functionality to mobile devices that doesn't require access to large-scale mobile or wireless networks. Another object of the present disclosure is to provide a portable processing unit add-on for mobile devices that makes said access as easy as possible.

Another object of the present disclosure is to provide a portable processing unit add-on for mobile devices that provides a desktop-like environment for mobile devices that can be configured, customized and/or secured by the IT department which manages the infrastructure belonging to the organization for which the user works.

Another object of the present disclosure is to provide a portable processing unit add-on for mobile devices that provides device-agnostic and software-version-agnostic functionality which the user can upgrade and maintain separately from his mobile device.

Another object of the present disclosure is to provide a portable processing unit add-on for mobile devices that provides PC-like functionality in an ultra-portable form-factor.

Another object of the present disclosure is to provide a portable processing unit add-on for mobile devices that provides means for users to store, manage and access their passwords securely.

Another object of the present disclosure is to provide a portable processing unit add-on for mobile devices that provides users with a means for having access to and the ability to process large amounts of information that doesn't necessarily depend on the use of solid-state storage.

At least one of the preceding objects is met, in whole or in part, by the present disclosure, in which there is provided a computing device and method for a portable processing unit add-on for mobile devices.

According to the present disclosure, there is provided a portable processing unit add-on computing device for mobile devices comprising one or more processors, memory and means for remotely displaying and receiving input for its user interface.

According to the present disclosure, there is further provided a method for augmenting the capabilities of a mobile device by way of a portable processing unit add-on.

It is hereby noted that for brevity purposes, both the figures used in the present disclosure and the following text use the acronym "PPU" instead of "portable processing unit". All instances of "PPU" should therefore be read in context as "portable processing unit". For example, "PPU add-on" stands for "portable processing unit add-on".

The PPU is preferably, but not necessarily, a separate device from the mobile device with its own physical housing and power source. It preferably, but not necessarily, runs a desktop-grade operating system such as Microsoft Windows™ or Ubuntu Linux™. Its preferably, but not necessarily, based on a desktop-grade processor from the Intel™ x86 architecture family. The PPU interacts with the mobile device in order to allow the mobile device's user to access the PPU's functionality. It is therefore typically through the mobile device that the user would obtain desktop-like functionality by way of mating said mobile device with a PPU add-on.

The mating process and communication protocol between the PPU add-on and the mobile device can vary greatly. As a simple example, the PPU add-on and the mobile device may be made to mate and communicate using Bluetooth™. However, such interaction could also be achieved using Wifi or another wireless protocol or even using wired mechanisms such as a direct Universal Serial Bus (USB) connection between both devices. In the later case, the USB link could also be used to supply stand-by/charging power from the PPU add-on to the mobile device; the PPU add-on acting as a backup battery for the mobile device.

The PPU is preferably, but not necessarily, made to physically snap or connect to the mobile device in such as way as to have the PPU add-on and mobile device be always carried together. In the case of a mobile phone, the PPU add-on would typically snap onto the back of the phone in a similar fashion as a protective case. In the case of a tablet, the PPU add-on may be embedded in the tablet's sleeve. In both cases, the PPU may be constructed to be embedded inside a keyboard housing made available to the user once the PPU add-on is attached to the mobile device. In the case of a phone, the keyboard/PPU body may be made to slide out from underneath the phone in order to allow the user to use the keyboard. In the case of a tablet, the keyboard/PPU body may be part of a clamshell tablet sleeve that allows the user to type on the keyboard when the sleeve is opened to expose the tablet's screen.

The PPU may however also be made to be remotely accessible from the mobile device, though while still remaining within close physical range of said mobile device. The PPU may, for instance, be stored in a back-pack or back-pocket of the user's separately from the mobile device and be available over wireless network when needed. In such a configuration, the PPU may or may not have a keyboard. In both cases, the PPU's functionality remains accessible by the user through the mobile device.

To interface the PPU with the mobile device, the user may either use a custom app specifically designed for that purpose or a generic application to allow remote desktop interaction, such as the many Virtual Network Computing (VNC)- or Remote Desktop Protocol (RDP)-based apps available on both iOS and Android. Either way, the specific app used for interfacing may or may not be dependent on the type of protocol or mechanism used to allow the PPU and the mobile device to mate and communicate. VNC, for instance, may be used either over Bluetooth, Wifi or USB.

Preferably, but not necessarily, the app for allowing the user to interface with the PPU is available on the mobile device alongside the other apps. It may be installed manually by the user or automatically for them. Preferably, but not necessarily, there are also visual indicators on the mobile device to provide information on the PPU's state and/or the state of the connectivity to it. For instance, a foreground notification—which shows up as status bar icon on the left hand side of the status bar—could be used on Android's status bar to indicate that the PPU is connected.

The PPU could double as a hardware keyboard input device for the mobile device's original OS, such as iOS and Android. The PPU could also be used as an external storage device for the mobile device or the user's desktop and/or laptop. The PPU could also be equipped with a secondary Liquid Crystal Display (LCD) display for displaying secure information such as passwords.

Other features of the presently disclosed computing device and method will become apparent from the following detailed description taken in conjunction with the accompanying drawings, which illustrate, by way of example, the presently disclosed computing device and method.

BRIEF DESCRIPTION OF THE DRAWINGS

A detailed description of preferred embodiments will be given herein below with reference to the following drawings, in which like numbers refer to like elements:

FIG. 1 is an embodiment illustrating a portable processing unit add-on for mobile devices according to the present disclosure where an iPhone is shown before and after connection to the add-on.

Note that many diagrams are based on material provided in the public domain at openclipart.org. Also, some of the screenshots used are distributed on flickr.com under CC-BY license by their copyright holders. Specifically:

iPhone screenshot: Jacob Munk Stander at https://secure.flickr.com/photos/jacobms/and https://secure.flickr.com/photos/jacobms/4356095126/sizes/o/in/photostream/ iPad screenshot: Ben Atkin at https://secure.flickr.com/photos/vote_zaphod_beeblebrox/4515861912/sizes/o/in/photolist-7T3Yq9-7TFfmC-aedX4d-8fUgrR-9FWowF-9FWosk-9RPgDE-fDKDVD-amA7Yb-9Eoaer-dMchmr-9RLmWx/ and https://secure.flickr.com/photos/vote_zaphod_beeblebrox/

DETAILED DESCRIPTION OF THE PREFERRED EMBODIMENTS

A portable processing unit add-on for mobile devices is "portable" because it fits many of the same criteria typically applied to mobile devices such as phones and tablets that make them being designed as "portable". Namely, it's typically, but not necessarily, battery powered, small, and light; contrasting it to traditional computing devices such as a desktop or workstation. The term "processing unit" here is meant to loosely correspond to a basic central processing unit (CPU) and its associated Random Access Memory (RAM), storage and basic Input/Output (I/O). The PPU may, however, comprise alternate or additional modules. Other designs may be envisioned where the PPU is nothing but a CPU and a System-on-Chip (SoC) or System-on-Module (SoM) or whatever means become available for packaging processing capabilities into components.

Figure 1:
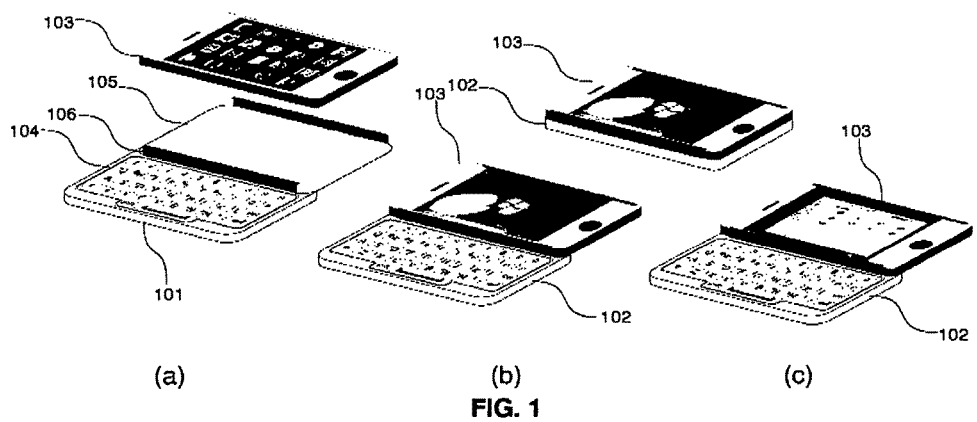

FIG. 1 illustrates the PPU add-on before 101 and after 102 it's connected to an Apple iPhone™ 103. On the left (FIG. 1(*a*)) we see the PPU add-on 101 separately from the iPhone 103. The PPU 101 in this case is made of two parts that mechanically slide one top of the other. The bottom part 104 is a keyboard housing at least one processor and memory along with all the electronics and software that make the PPU provide its functionality. The top part 105 is essentially a base-plate with some form or another of mechanical hooks 106 that allow the PPU 101 to snap to the body of the iPhone 103. This diagram illustrates the hooks 106 as snapping to the sides of the iPhone 103. Other hooking and attachment mechanisms can also be envisioned. To simplify the drawing, the illustration doesn't show the iPhone's buttons and in fact hooks such as shown would probably obstruct the iPhone's buttons. However, for a real PPU add-on, provisions would be made to respect the iPhone's form-factor and other functionality such as location of buttons and back camera.

In the middle of FIG. 1 (FIG. 1(*b*)) we see the PPU add-on 101 providing a Windows™ interface through the iPhone 103. Two configurations are illustrated, one with the PPU keyboard opened and the other where the PPU's keyboard is closed. Note that a PPU 101 that doesn't have a keyboard would visually bare resemblance to a PPU whose keyboard is closed. On the right hand-side of FIG. 1 (FIG. 1(*c*)), we see the PPU add-on 101 running Ubuntu Linux™ instead of Windows™. Insofar as the hardware inside the PPU is capable of running any desktop-grade OS, there's no reason it can't run many other OSes other than Windows™. It could, in fact, probably be made to run Debian, RedHat™, FreeBSD or Mac™ OS or, even, a custom OS.

The operation of the PPU could be made conditional to the opening of the keyboard. For example, it may be desirable to have an app on the iPhone or an Android device that automatically brings the PPU's desktop UI to the front of the iPhone's user interface whenever the keyboard is opened. The user could also be required to manually start a certain application in order to access the PPU's interface on the mobile device. On some mobile devices, such as Android devices for instance, the PPU's interface could also be displayed as a "live wallpaper" in the back of the mobile's devices main screen. In this way, the PPU's display would continue to be visible to the user in the background but all input he does on the mobile device would still go to the mobile device's main OS. The user would then have to use specific controls or enter a certain app in order for the PPU's display to come to the foreground and be active, thereby allowing the user to interact with the OS and applications running on the PPU.

Either way, the PPU itself typically, but not necessarily, has no means to display the interface of the OS or the applications it's running. Instead, the PPU's display is done on the mobile device's screen using a regular application running on the mobile device's OS without requiring modifications to said OS or the device's internals. As was mentioned earlier, this display can be done remotely using a known protocol, such as VNC or RDP, or using a custom protocol. One of the easiest means for mating the PPU to the mobile device and enabling two-way communication is likely Bluetooth, but other means such as Wifi and direct USB link could also be used. In addition to using some form of networking link to transfer the display from the PPU to the mobile device, whichever link is used could also be used to transmit touch events from the mobile device as mouse clicks or touch events to the OS running on the PPU. Long-presses could also be transmitted as "right clicks" on desktop OSes running on the PPU. Other uses of the link between the PPU and mobile device could also be made to enable transferring information and key events between the PPU and the mobile device.

Figure 2:
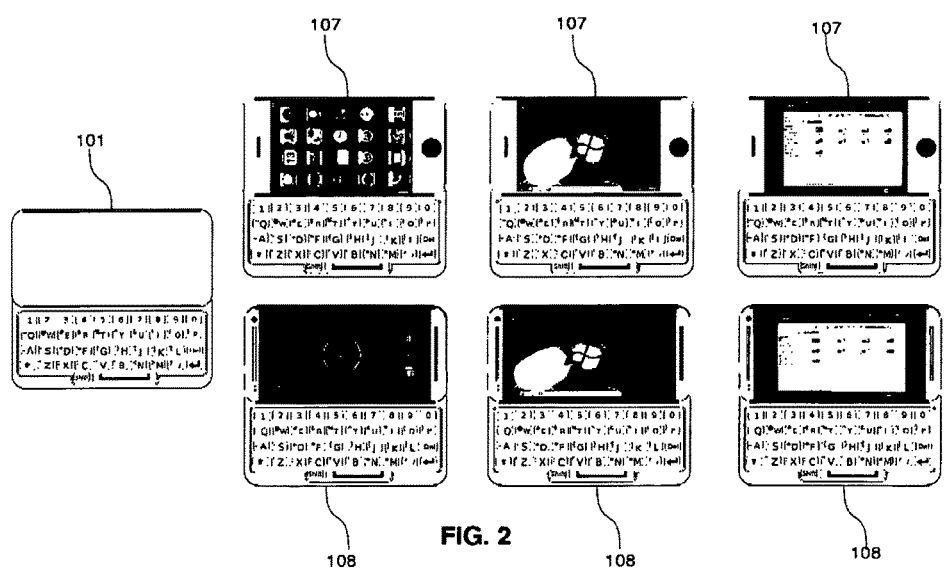
FIG. 2 is an embodiment illustrating a portable processing unit add-on for mobile devices according to the present disclosure where other views are shown of the add-on with iPhone and Android devices.
Figure 3:
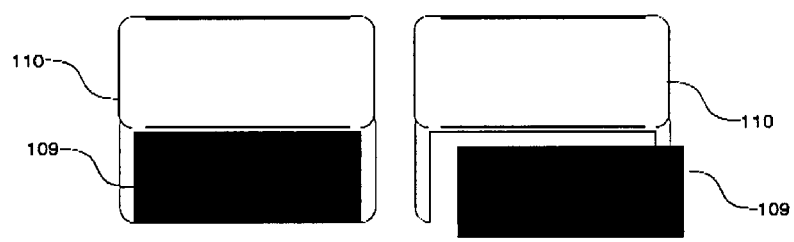
FIG. 3 is an embodiment illustrating a portable processing unit add-on for mobile devices according to the present disclosure where a core add-on module is swappable with replaceable, mobile-device-specific skins/bodies.

FIG. 2 illustrates the PPU's 101 use with both the iOS-based iPhone 107 and an Android-based device 108. PPU add-ons may, however, be also used with other mobile OSes such as BlackBerry's™ OS and Windows Mobile™. Various mobile device form-factors could be supported by means of custom PPUs for each type of phone. FIG. 3 illustrates a variant where the PPU add-on is separated into a core module 109 and a mobile-device-specific skin or harness or case 110. This would allow manufacturing a single core module 109 that could work for multiple phones and phone-specific modules to snap onto specific phone models. In fact, licenses could be sold or granted to allow 3rd parties to manufacture phone-specific bodies based on a core PPU add-on 109.

Figure 4:
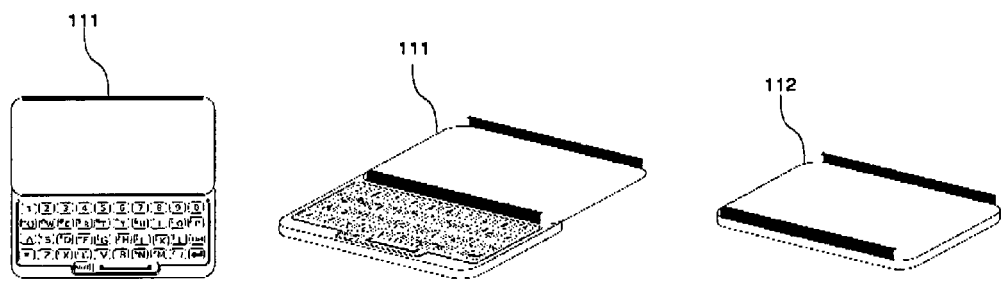
FIG. 4 is an embodiment illustrating a portable processing unit add-on for mobile devices according to the present disclosure where the add-on is shown on its own.
Figure 5:
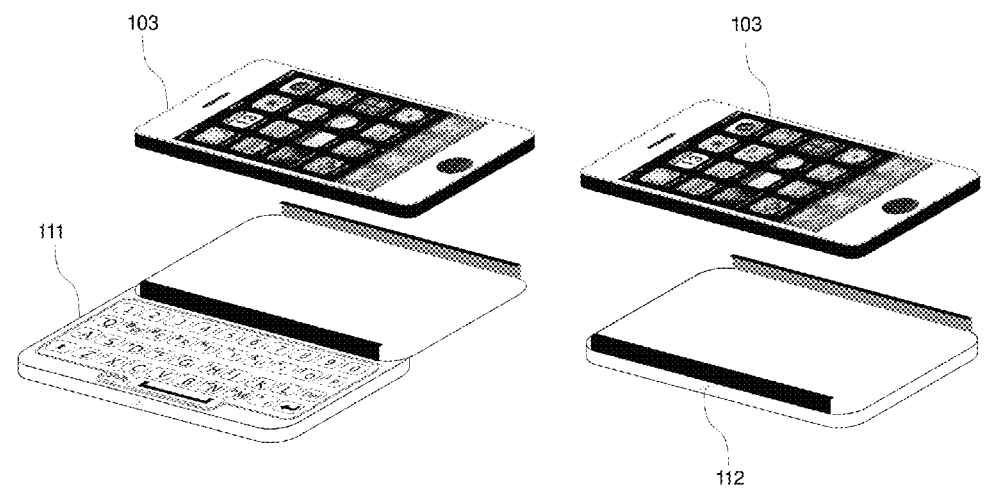
FIG. 5 is an embodiment illustrating a portable processing unit add-on for mobile devices according to the present disclosure wherein the add-on and an iPhone are shown before being connected.
Figure 6:
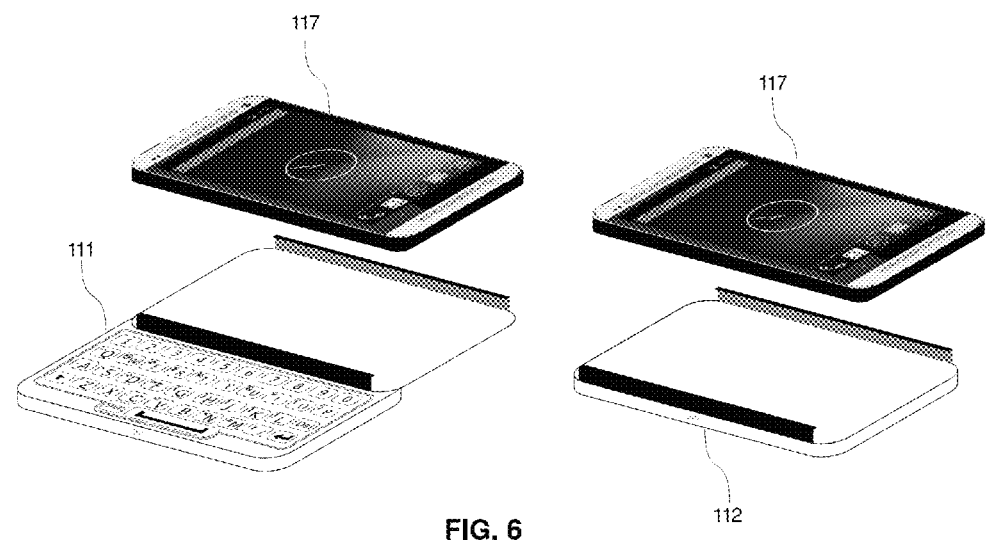
FIG. 6 is an embodiment illustrating a portable processing unit add-on for mobile devices according to the present disclosure wherein the add-on and an Android-based phone are shown before being connected.

FIGS. 4, 5 and 6 illustrate the PPU independently from the mobile devices it might be connected to. On the left (FIG. 4(a)) and the middle (FIG. 4(b)) of FIG. 4, we see the PPU with its keyboard open 111, and of the right-hand side of the same figure (FIG. 4(c)), we see it with the keyboard closed 112. Again, the PPU with the keyboard closed 112 would be very similar to a PPU that doesn't have a keyboard. If a PPU didn't have a keyboard then its keyboard and mouse input would come from the mobile device's 117 interface. Presumably the touch-based, virtual keyboard from the mobile device 117 would be used to provide keyboard input to the OS and applications running on the PPU.

Regardless of the PPU's form-factor, the OS and applications running on the PPU would behave very much in the same way as if a keyboard, mouse and screen where connected to a regular computer, even if such input and output in the case of the PPU is simulated or provided via different means than would be on a regular computer such as a desktop system.

Figure 7:
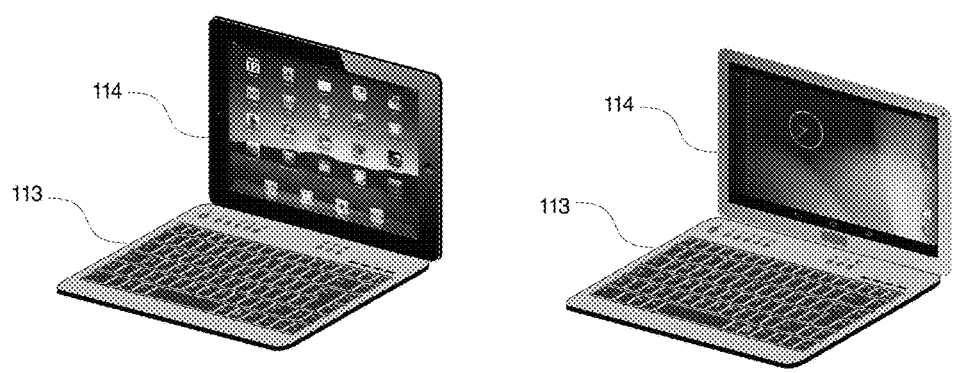
FIG. 7 is an embodiment illustrating a portable processing unit add-on for mobile devices according to the present disclosure where the add-on is connected to an iPad™ and an Android™-based Tablet.

FIG. 7 illustrates another PPU add-on form-factor 113 where the keyboard housing the processor(s) and memory is made to be part of the sleeve that attaches to a tablet 114 in a clamshell form-factor instead of as a slide-out keyboard. The PPU's display onto the tablet isn't show as in the case of the phones above, but the concept is the same. The tablet's display and touch-input capabilities are used for enabling interaction with the OS running on the PPU.

Figure 8:
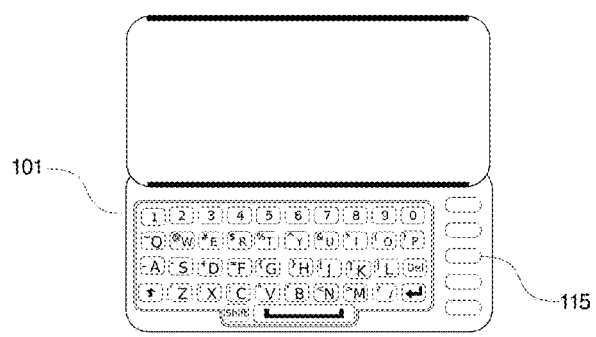
FIG. 8 an embodiment illustrating a portable processing unit add-on for mobile devices according to the present disclosure where the add-on has function keys in addition to a keyboard.
Figure 9:
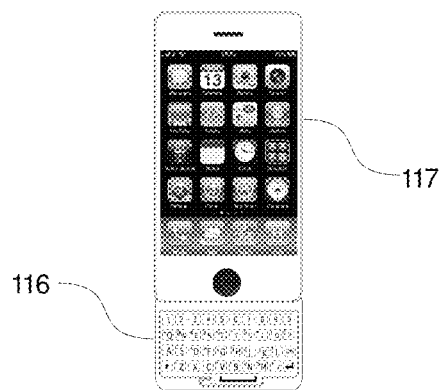
FIG. 9 is an embodiment illustrating a portable processing unit add-on for mobile devices according to the present disclosure where the add-on is a slide-out keyboard at the bottom of an iPhone.
Figure 10:
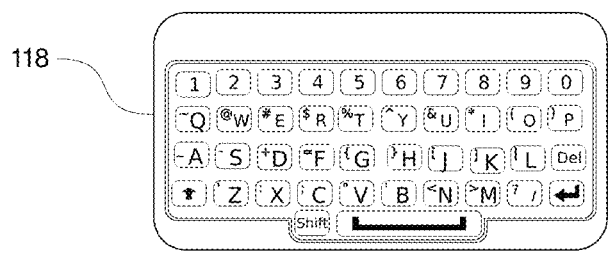
FIG. 10 is an embodiment illustrating a portable processing unit add-on for mobile devices according to the present disclosure where the add-on is standalone without any direct physical connection to a mobile device.
Figure 11:
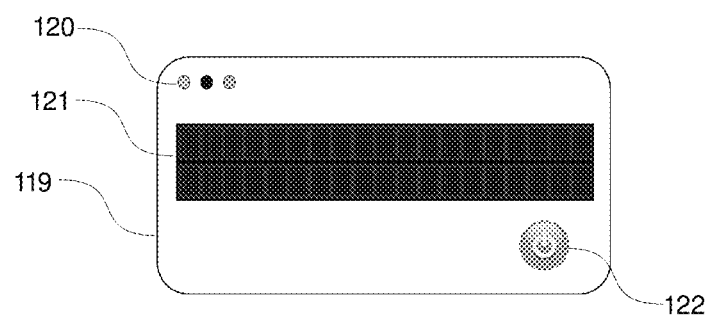
FIG. 11 is an embodiment illustrating a portable processing unit add-on for mobile devices according to the present disclosure where a keyboard-less add-on is standalone without any direct physical connection to a mobile device.

There are obviously a great deal many variations that could be made to the PPU add-on while still being covered by the current disclosure. FIG. 8, for instance, illustrates a PPU 101 that has a number of function keys 115 on the right-hand-side of the keyboard. Such keys could be used for powering-on the PPU or controlling the mating of the PPU with the mobile device. Other additions could be made to the input such as a mouse pointer and/or right-click and left-click buttons. FIG. 9 is another variant where the slide-out keyboard comes out at the bottom 116 of the mobile device 117 instead of side-ways. FIG. 10 illustrates yet another variant where the PPU isn't directly connected to the mobile device 118. Instead, its a stand-alone keyboard that has a processor and memory inside of it and that can remotely interact with the mobile device. The PPU would then be used with the mobile device even if it isn't directly connected. FIG. 11 illustrates a similar remote PPU that doesn't have a keyboard 119. In this case, the PPU would typically be in a users back-pocket or back-pack and he'd use his mobile device to interact with the PPU over a short-distance link such as Bluetooth.

Note that the stand-alone PPU 119 in FIG. 11 could have other features such as specific lights 120, an LCD panel 121 and a power button 122 for simplifying interaction with this type of PPU since a keyboard is missing. The LCD could 121, for instance, be used to provide status information on the PPU and so could the LED lights 120.

Figure 12:
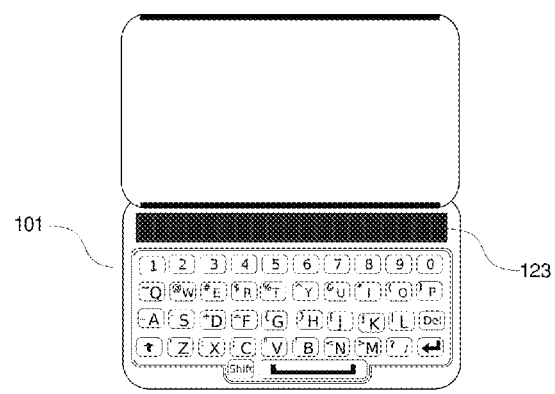
FIG. 12 is an embodiment illustrating a portable processing unit add-on for mobile devices according to the present disclosure where the add-on has a separate LCD display.

The concept of using an LCD displayed is also shown in FIG. 12 where a keyboard-full PPU 101 has a row of LCD display atop its keyboard 123. In this case, the LCD display 123 could be used as a means for the entry and retrieval of user passwords in a secure fashion. For instance, it should be possible to have an app on the mobile device which allows the user to manage his passwords. Functionality would be provided for viewing a list of stored passwords, for adding new ones, for deleting and modifying existing ones, and for backing passwords up. The mobile device and its interface, however, would never actually have access to the passwords either in encrypted form or clear-text form. Instead, the passwords would be shown on the PPU's LCD 123 when they are selected for entry and/or retrieval from the app on the mobile device. The LCD 123 could be controlled by the OS running on the PPU's main processor. However, and this is likely more interesting, the PPU could also be made to house a separate micro-controller as illustrated in the third diagram from the left in FIG. 15. Said micro-controller would have its own memory and storage and direct access to the keyboard's input. As such, when a password is requested or retrieved, it's the micro-controller's task to take care of the storage and retrieval of the password from its separate, secure memory. Therefore, neither the mobile devices OS nor the desktop OS running on the PPU's main processor would ever have access to the passwords securely managed by the micro-controller. Yet, the user is given an easy way to see the list of passwords on his mobile device and a secure mechanism for seeing stored passwords and storing new ones.

Figure 13:
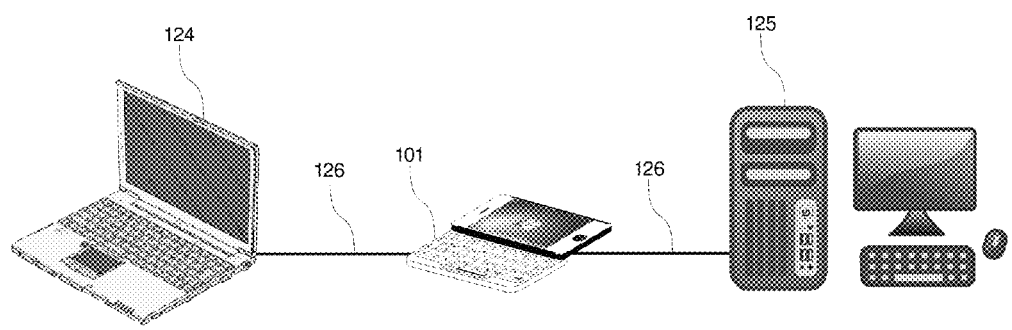
FIG. 13 is an embodiment illustrating a portable processing unit add-on for mobile devices according to the present disclosure where the add-on acts as a storage device for a laptop and/or desktop.

FIG. 13 illustrates the use of the PPU 101 as a storage device for a laptop 124 and/or a desktop 125. The PPU could also serve as a storage device for the mobile device. The way in which the PPU provides storage can vary greatly. The link 126 in FIG. 13, for instance, could be anything from a direct, wired connection to a wireless connection. In addition, the protocol or software mechanism used to expose the storage functionality could vary greatly. Possibilities of remote storage functionality and/or access could include server Message Block (SMB), Network File System (NFS), Web Distributed Authoring and Versioning (WebDAV), File Transfer Protocol (FTP), Secure SHell (SSH) etc. There's nothing precluding the OS running on the PPU to provide the same file-sharing functionality that it could provide if it were running on a stand-alone desktop or laptop.

By having its own large storage, the PPU de-facto becomes the user's main desktop and replaces his laptop and desktop. This is especially useful for frequent travelers and executives. The user's laptop and desktop could then sync with or use the data storage on the PPU's storage device for use by the software running on those computers whenever the user needs. The PPU could also provide external connectivity allowing the creating of PPU docking stations that the user could use to connect the PPU to a bigger screen and full-sized keyboard and mouse whenever appropriate. Such a docking station could be like conventional laptop docking stations that the user would use when he's back at his office. However, one can envision a portable docking station that could resemble a full-fledged laptop which would allow the user to connect the PPU to said portable docking station and use the combined docking station and PPU as a typical laptop. Such contraptions have been attempted with classic mobile device (ex.: Motorola Atrix). In those cases, however, it was the mobile device itself that was docked, meaning that the functionality was gated by the fact that the mobile device was running a mobile OS, not a full-fledged desktop OS such as Windows™ on a separate processor. In addition, even in the cases where some form of desktop OS was used, it was bidden from the user. In the case of a PPU attached to dock, the full desktop OS would be exposed to the user.

Figure 14:
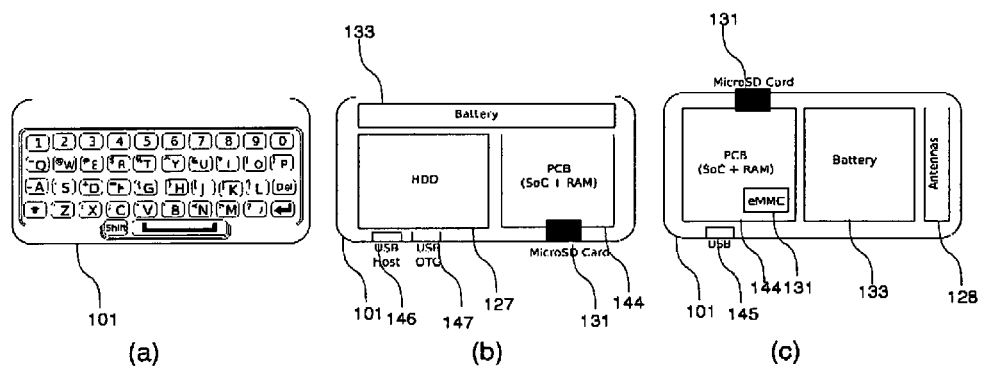
FIG. 14 is a block diagram illustrating the internals of computing devices which implement embodiments of a portable processing unit add-on for mobile devices according to the present disclosure.

FIG. 14 illustrates the insides of a typical PPU 101. The diagram in the middle (FIG. 14(b)) and the one on the right-hand-side (FIG. 14(c)) illustrate two possible internal layouts of the PPU 101. Many other layouts are obviously possible. In the case of the middle diagram (FIG. 14(b)), a large physical disk 127 is provided for allowing the PPU 101 to contain a very large storage device, much like a laptop. In the case of the diagram on the right, the PPU 101 is equipped with its own wireless antennas 128 which could, for instance, enable it to have its own separate GSM™ or Code Division Multiple Access (CDMA) connection, thereby enabling a completely separate cell-phone-like functionality to the PPU. There is nothing, in fact, precluding the PPU from running yet another mobile OS. For example, a user could have an iPhone as his main mobile device and use an Android-running PPU attached to his iPhone. The diagrams also illustrate the Printed Circuit Board (PCB) 144 containing the SoC and the RAM, and USB connectors 145. The PPU has both USB host 146 and USB On-The-Go (OTG) connectors 147.

Figure 15:
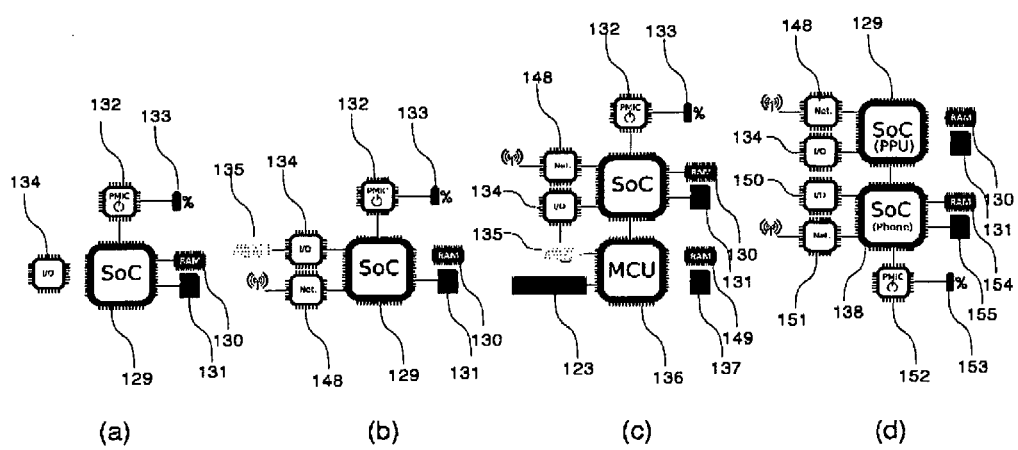
FIG. 15 is a block diagram illustrating the internal circuitry of various computing devices which implement embodiments of a portable processing unit add-on for mobile devices according to the present disclosure.

FIG. 15 illustrates some examples of the PPU's possible internal circuitry. On the left-hand-side (FIG. 15(a)), we see a basic PPU illustrating some of components typically, but not necessarily, required for it to run. Namely a System-on-Chip 129, RAM (memory) 130, a storage device 131, a power-management Integrated Circuit (IC) 132, a battery 133 and some I/O 134. Obviously things could be further integrated with the power-management being part of the SoC. Also, other storage such as eMMC or NOR or NAND flash can be used instead of the illustrated SD card. Also, power may be provided by other means than a battery. As mobile devices evolve, whatever power means are used to power mobile devices could also be used to power a PPU. The PPU's functionality is in fact independent of the type of power that is used to make it operate. The SoC may also not require a power-management IC 132.

The second diagram from the left (FIG. 15(b)) in FIG. 15 illustrates the circuitry for a PPU that has a keyboard 135 as illustrated in FIG. 1. It also illustrates networking capabilities 148. The third diagram from the left (FIG. 15(c)) illustrates a PPU that has a separate micro-controller unit (MCU) 136 and its RAM 149 and storage 137 for the management of the stand-alone LCD 123 such as described earlier for FIG. 12. Mechanisms would be put in place to allow the micro-controller and the SoC to communicate and synchronize with regards to the information to be displayed on the LCD 123. The app running on the SoC could, for instance, instruct the micro-controller to display the password corresponding to a certain identifier. The SoC would never see the password pass in its silicon, neither would its RAM. Only an identifier would be exchanged between the SoC and the micro-controller. The password would only transit in the micro-controller 136 and its storage 137. Additionally, the keyboard 135 could be wired such that when password input is activated, the input going to the keyboard 135 only goes to the micro-controller 136, not the main processor 129.

The diagram on the right (FIG. 15(d)) of FIG. 15 illustrates a configuration where the PPU is integrated into the same physical housing as the mobile device; the mobile device having its own SoC 138, I/O 150, networking capabilities 151, power-management IC 152, battery 153, RAM 154 and storage 155. It should be obvious to those skilled in the art that there are benefits to integration, especially should the functionality of a PPU as disclosed herein become popular or standard in the market. Therefore, the next logical step would be to integrate the PPU's functionality directly into mobile devices. This would benefit the user by providing him a lower total cost of purchase and would avoid having separate power sources and, most importantly, would avoid the possible annoyance some users may feel of having to carry a device that some could consider physically bulky because of the total size of stacking the PPU to the phone's thickness. This could also provide greater integration between the mobile OS running on the mobile device and the desktop OS running on the PPU. In such a configuration, the PPU's SoC 129 would be connected to the Phone's SoC 138 and through some kind of bus or serial connection.

Figure 16:
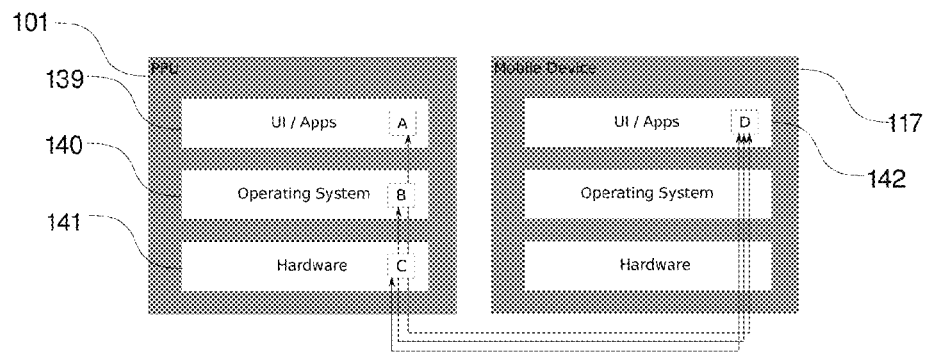
FIG. 16 is a block diagram illustrating software layer interactions between a portable processing add-on for mobile devices and the mobile device, thereby implementing an embodiment of a portable processing unit add-on for mobile devices according to the present disclosure.

FIG. 16 illustrates the PPU's 101 connection to the mobile device 117. Namely, we can see that the PPU's various layers (A 139, B 140 and C 141) are typically made to interact with an app on the mobile device (D) 142. As such, this further illustrates that no modification is required to the mobile device's 117 OS or hardware in order to interface with the PPU 101. Instead, the mobile device's 117 existing functionality is used to connect both devices together with, most likely, an app 142 on the mobile device 117 acting as the key component for allowing both devices to interact and provide the user with the expected functionality. The mobile device 117 continues, however, to operate exactly as it did before. Its controls (buttons, notifications, dialogs, etc.), for example, continue to operate as they would had the PPU 101 not been connected. When possible, as explained earlier, deeper integration can be used to enhance user experience. Status bar icons and notifications on the mobile device 117 can, for instance, be used to provide the user with information about the PPU's 101 state. If possible, also, the PPU's 101 display could be shown as a live wallpaper on the mobile device.

Figure 17:
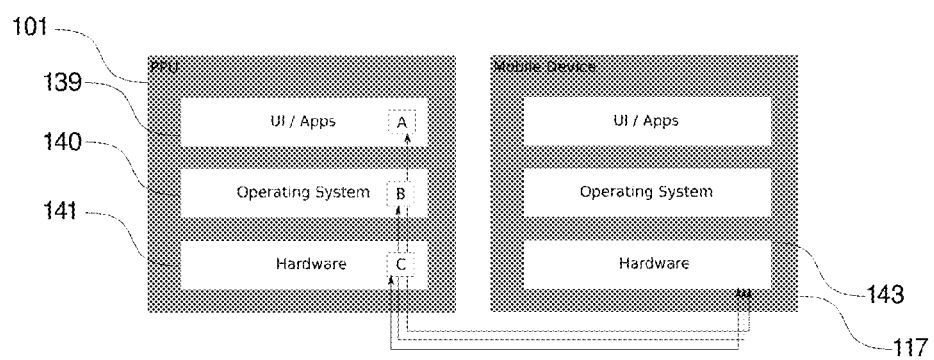
FIG. 17 is a block diagram illustrating interactions between the PPU and the mobile device's hardware, thereby implementing an embodiment of a portable processing unit add-on for mobile devices according to the present disclosure.
Figure 1:
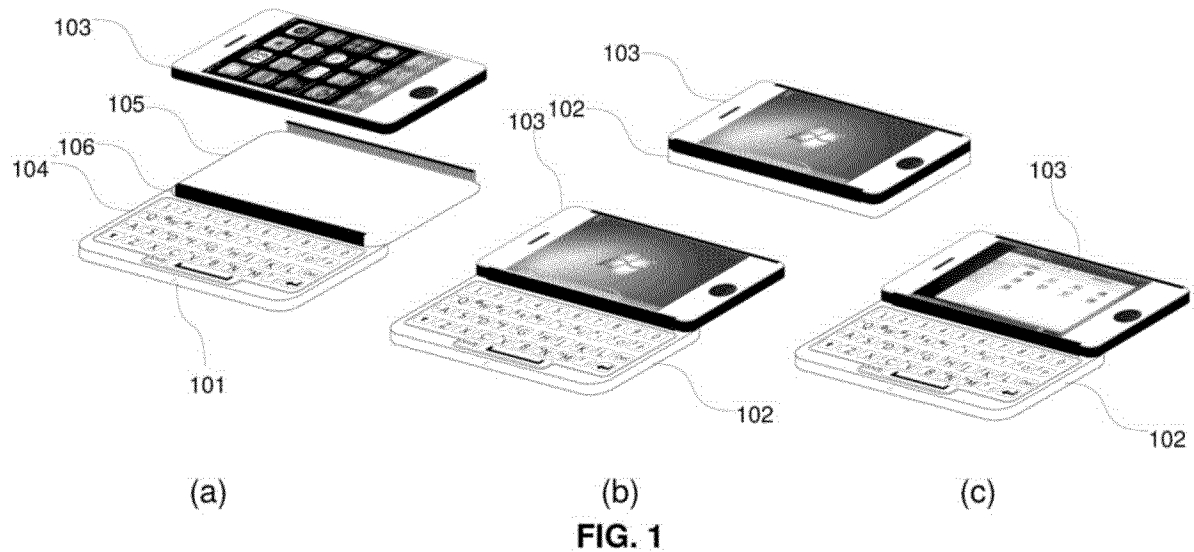
Figure 2:
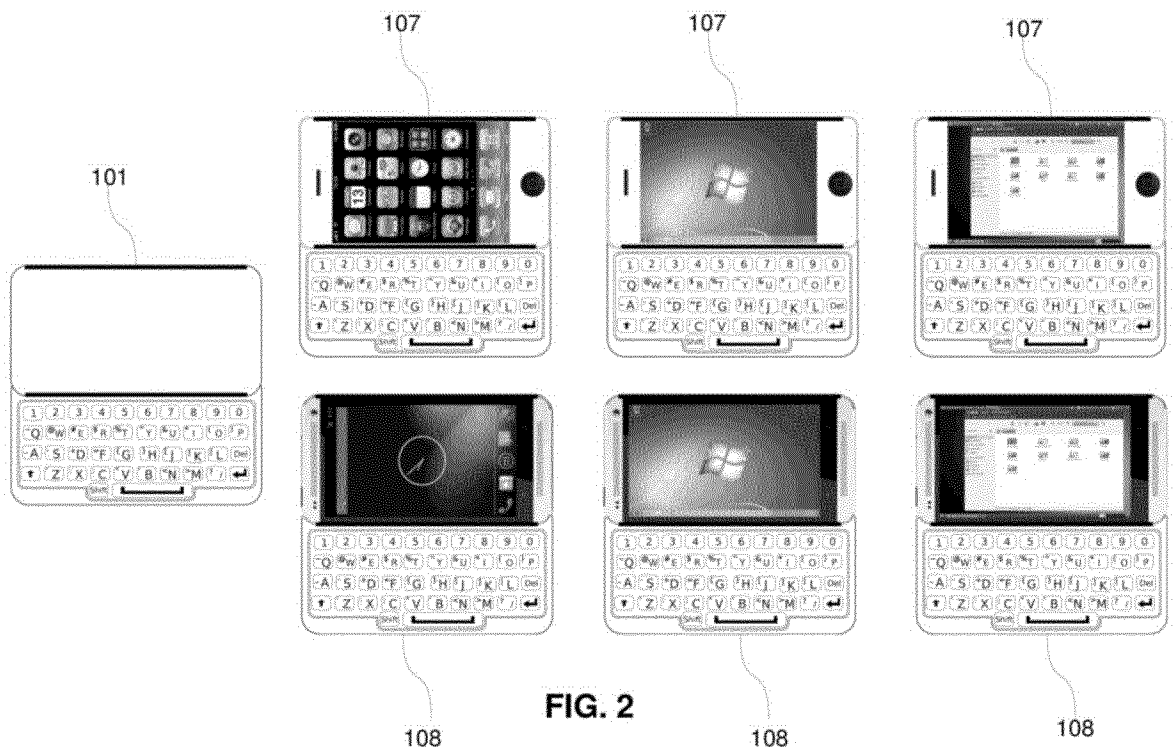
Figure 3:
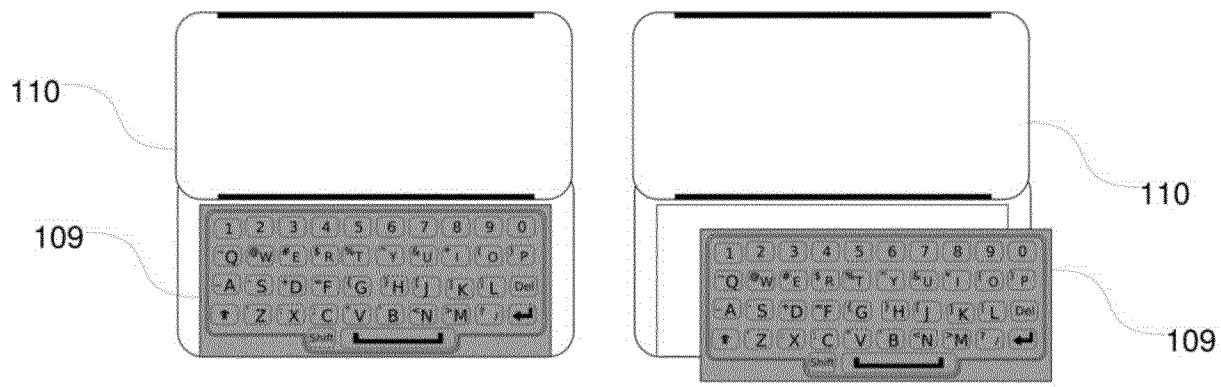
Figure 4:
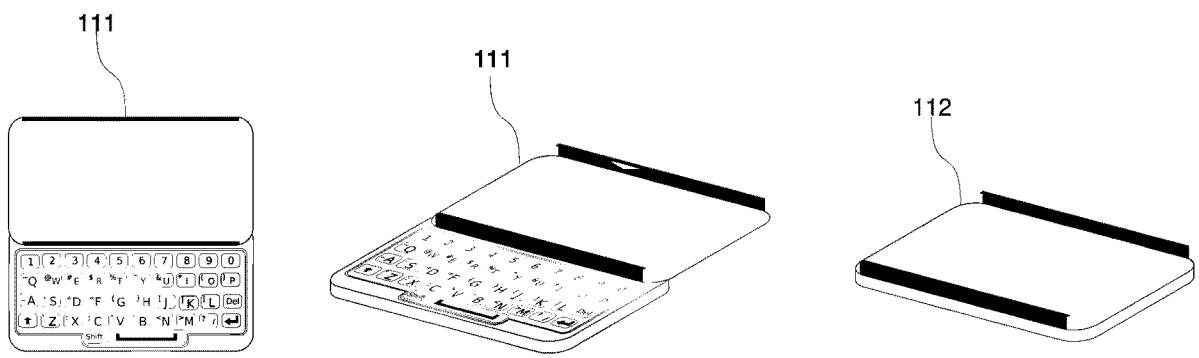
Figure 14:
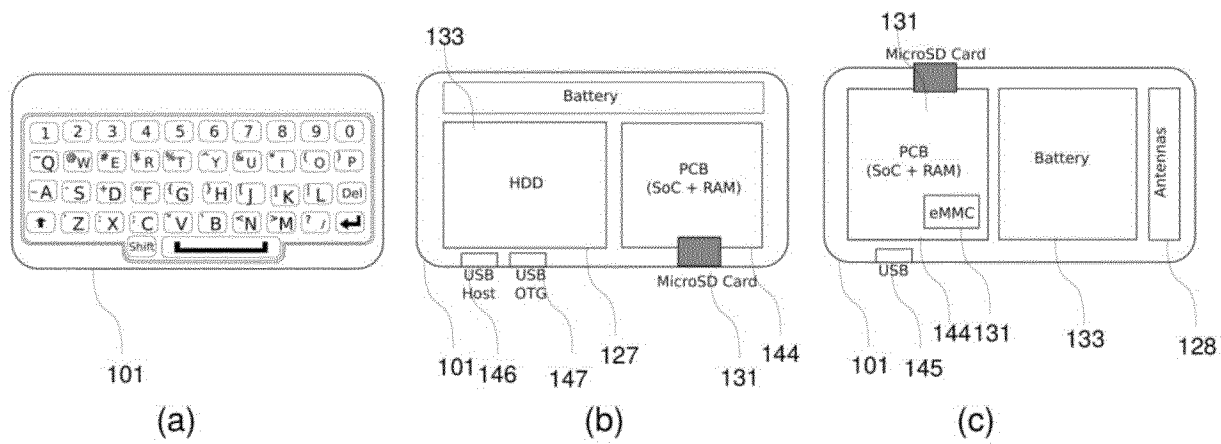
Figure 15:
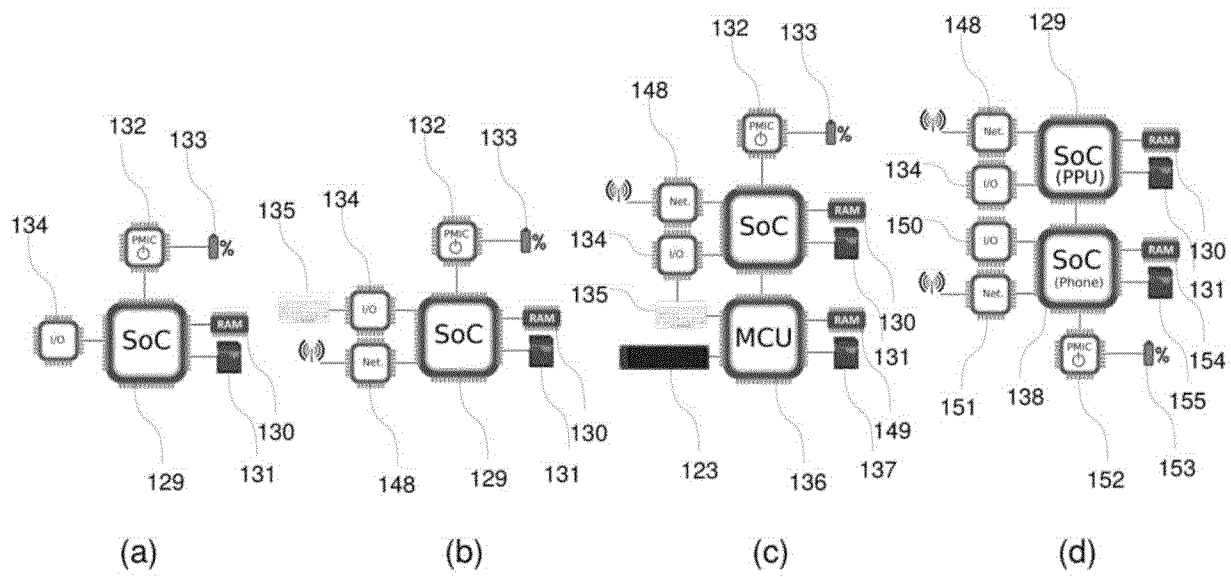

FIG. 17 illustrates a different configuration of the use of the PPU's 101 functionality where its various components can be used to provide input to the mobile device's 117 hardware 143 instead of a specific app. For instance, the PPU 101 could act as a Bluetooth keyboard for the mobile device 117, thereby providing a hardware keyboard in addition the device's software/on-screen keyboard. As such, the PPU's stack would only act as input to the mobile device's Bluetooth modules.

Several other enhancements are also possible without departing from the teachings of the current disclosure. Here are, in no specific order, a list of features, additions or modifications that could be made to the PPU add-on for mobile devices:

The PPU could be made to suspend/resume on the closing/opening of the slide-out keyboard. This behavior would be similar to the closing and opening of a laptop lid.

A retractable angled support bracket could be provided on the back of the PPU to allow having the PPU connected to a phone to stand on a desk at a 45 or 30 degree angle.

The PPU's display could be made to be remotely accessible from a laptop in addition to the mobile device. In this way, an ordinary laptop could be used to interact with a PPU.

The PPU could have buttons on the side of its body for power on/off and standby along with buttons for mating with the mobile device.

The PPU could have extensive connectivity capabilities such as support for Bluetooth, Wifi, USB, High-Definition Multimedia Interface (HDMI), CDMA, GSM, Near Field Communication (NFC), Firewire, DisplayPort, MicroSD, External Serial Advanced Technology Attachment (eSATA), Stereo In/Out, etc.

The PPU could also have its own set of sensors (gyroscope, accelerometer, compass, temperature sensor, etc.)

Ruggedized and industrial-grade versions of the PPU could be made to cater for specific needs.

While the PPU has been described here as being based on an x86-type SoC, there is nothing precluding the PPU from being based on another CPU architecture such as ARM or MIPS.

Strong authentication mechanisms could be used between the PPU and the mobile device to ensure secure communication between the two devices and avoid potential snooping or confusion with other PPUs available within the same vicinity as the users own PPU and mobile device.

Wireless charging could be built into the PPU to simplify charging.

Alternate mechanical and electronic connector designs could be used to make it so that only one of the PPU or the mobile device is connected to a charging adapter while still both are being charged.

A PPU-specific dongle could be provided for making the PPU's functionality available to a laptop or desktop by simply having the dongle connected to said laptop or desktop's USB slots. This would be similar to the functionality achieved with some wireless mice and keyboard devices which only require the corresponding dongle to be connected to a laptop or desktop to function properly. In this way, connecting the USB dongle could, for instance, result in the PPU's storage to automatically appear as a USB storage device on the laptop or desktop.

Another type of dongle could also be provided for mating the PPU to the phone or mobile device.

The PPU's keyboard could be connected to its internal circuitry using the USB bus instead of being directly connected to the circuitry's I/O lines. As such, it would appear to the OS running on the PPU as a USB keyboard.

The micro-controller 136 and its memory along with the corresponding LCD could be connected to the PPU as a self-contained USB device. As such, the PPU's main processor would interact with the micro-controller over USB. This would have the benefit of using a standard bus interface for connecting the micro-controller to the SoC.

The PPU's physical body could be made to snap both mechanically and electronically to the mobile device's existing external connectors for ease of connectivity and power sharing.

The keyboard layout has been shown here as being QWERTY, but it could also be AZERTY, DVORAK or otherwise. It would be expected that the layout of be region-specific.

The PPU's USB connectivity could be both OTG and host capable, as some phones on the market currently support.

The PPU could have a docking station connector on its back to allow the PPU to be docked into a laptop-like docking station for connecting such things as an external monitor, USB keyboard and mouse, and optical drives.

The PPU could run any OS, not just desktop-grade OSes. For instance, the PPU could be running a custom, embedded Linux or embedded Android distribution for specific purposes based on the field of application.

The PPU could have a custom bootloader or it could use a conventional BIOS or a UEFI-capable firmware for booting its OSes.

The PPU could be made to be dual or multi-boot, as in the case of desktop systems.

The PPU could be based on either 32 or 64 bit CPU architectures or, even, other types of architectures.

There could be other uses for the micro-controller, its memory and associated LCD than just password management.

Apps on the mobile device could be designed to interface with apps or backend software running on the PPU.

Passwords managed by the micro-controller could be backed up in a secure fashion to the storage managed by the main processor. For instance, the software running on the micro-controller could be made to provide the main processor with an encrypted file containing the full set of passwords stored in the micro-controllers memory or storage for backup purposes. The encrypted password file could then be loaded back into a new PPU. An encryption password entered on the LCD panel, and therefore only accessible to the software running on the micro-controller, could be used for encrypting the password file. That would be the only password the user would have to remember or write down for future reference in case he looses his PPU. Along with a copy of the encrypted password file, he could then retrieve all his passwords.

It will be understood that numerous modifications and changes in form and detail may be made to the embodiments of the presently disclosed computing device and method. It is contemplated that numerous other configurations of the computing device and method may be used, and the modules of the computing device and method may be selected from numerous modules other than those specifically disclosed. Therefore, the above description should not be construed as limiting the disclosed computing device and method, but merely as exemplification of the various embodiments thereof. Those skilled in the art will envisioned numerous modifications within the scope of the present disclosure as defined by the claims appended hereto. In short, it is the intent of the Applicant that the scope of the patent issuing herefrom will be limited only by the scope of the appended claims. Having thus complied with the details and particularity required by the patent laws, what is claimed and desired protected is set forth in the appended claims.

What is claimed is:

1. A portable processing unit add-on for mobile devices comprising:
    at least one processor;
    at least one hardware memory device; and
    at least one storage device;
    at least one user interface generated by running, on the at least one processor, operating systems or applications retrievable from the at least one storage device;
    wherein the portable processing unit add-on has no means to display the user interface,
    wherein the portable processing unit is operable using the at least one hardware memory device, and
    wherein the portable processing unit add-on is configured for interacting with a mobile device to remotely display the user interface onto a display of the mobile device and remotely receive input from the mobile device for the user interface, wherein the portable processing unit add-on interfaces with the mobile device without any operating system or any hardware modification on the mobile device.

2. The portable processing unit add-on of claim 1, wherein the portable processing unit add-on further comprises at least one connector for connecting to an external monitor.

3. The portable processing unit add-on of claim 1, wherein the portable processing unit add-on further comprises means for running a desktop-grade operating system.

4. The portable processing unit add-on of claim 1, wherein the portable processing unit add-on comprises mechanical hooks to physically attach to the mobile device or is packagable with sleeves, cases or housings that are themselves attachable to the mobile device.

5. The portable processing unit add-on of claim 4, wherein input keys are further provided.

6. The portable processing unit add-on of claim 5, wherein the input keys form a keyboard.

7. The portable processing unit add-on of claim 1, wherein the portable processing unit add-on relies on at least one of the mobile device's hardware, the mobile device's operating system, the mobile device's built-in software, a software add-on to the mobile device, or an app runnable on the mobile device to interact with said mobile device.

8. The portable processing unit add-on of claim 1, wherein the portable processing unit add-on's power is provided by a battery.

9. The portable processing unit add-on of claim 1, wherein the portable processing unit add-on further comprises networking capabilities.

10. The portable processing unit add-on of claim 9, wherein the portable processing unit add-on is connectable to the mobile device via Bluetooth, Wifi, USB or some other form of networking link.

11. The portable processing unit add-on of claim 9, wherein the portable processing unit add-on is connectable to a laptop or a desktop system.

12. The portable processing unit add-on of claim 11, wherein the portable processing unit add-on can also remotely display its user interface on the laptop or desktop's display and remotely receive input from the laptop or desktop for its user interface.

13. The portable processing unit add-on of claim 1, wherein the remote display and remote input protocol used by the portable processing unit add-on to communicate with the mobile device is one of VNC, RDP or a custom protocol.

14. The portable processing unit add-on of claim 1, wherein the portable processing unit add-on further comprises a micro-controller separate from its at least one processor for the purposes of storing, managing and accessing passwords.

15. The portable processing unit add-on of claim 14, wherein the portable processing unit add-on further comprises an LCD to display the passwords as they are entered or retrieved.

16. The portable processing unit add-on of claim 1 wherein the portable processing unit add-on is connectable to a docking station comprising a display and optionally a physical input device such as a keyboard or mouse for use to provide display and input to an operating system running on the portable processing unit add-on.

17. A portable processing unit add-on for mobile devices comprising:
   at least one processor;
   at least one hardware memory device;
   at least one storage device; and
   at least one networking hardware;
   at least one user interface generated by running, on the at least one processor, operating systems or applications retrievable from the at least one storage device;
   wherein the portable processing unit add-on:
      comprises means for running a desktop-grade operating system;
      has no built-in means to independently display the user interface of operating systems or applications; and
      is configured for interacting with a mobile device through the at least one networking hardware to remotely display the user interface onto a display of the mobile device and remotely receive input from the mobile device for the user interface,
      wherein the portable processing unit add-on interfaces with the mobile device without any operating system or any hardware modification on the mobile device.

18. The portable processing unit add-on of claim 17, wherein the portable processing unit add-on is powered by battery.

19. The portable processing unit add-on of claim 18, wherein the remote display and remote input protocol used by the portable processing unit add-on to communicate with the mobile device is one of VNC, RDP or a custom protocol.

20. A method for remotely displaying onto a mobile device a user interface of a portable processing unit add-on having no means to display the user interface, and receiving input from the mobile device for the portable processing unit add-on's user interface, the method comprising the steps of:
   running, on an at least one processor, operating systems or software applications, retrievable from an at least one storage device, to generate the user interface on the portable processing unit add-on;
   connecting the portable processing unit add-on to the mobile device;
   sending the user interface of the portable processing unit add-on for display on a screen of the mobile device; and
   receiving input from the mobile device for the user interface of the portable processing unit add-on,
   wherein the portable processing unit add-on interfaces with the mobile device without any operating system or any hardware modification on the mobile device.

21. The method of claim 20, further comprising the steps of providing means for the portable processing unit add-on to run desktop-grade operating systems.

* * * * *

UNITED STATES PATENT AND TRADEMARK OFFICE
CERTIFICATE OF CORRECTION

PATENT NO. : 9,674,336 B2  
APPLICATION NO. : 14/519101  
DATED : June 6, 2017  
INVENTOR(S) : Karim Jean Yaghmour Page 1 of 5

It is certified that error appears in the above-identified patent and that said Letters Patent is hereby corrected as shown below:

On the Title Page

The figure should appear as shown below:

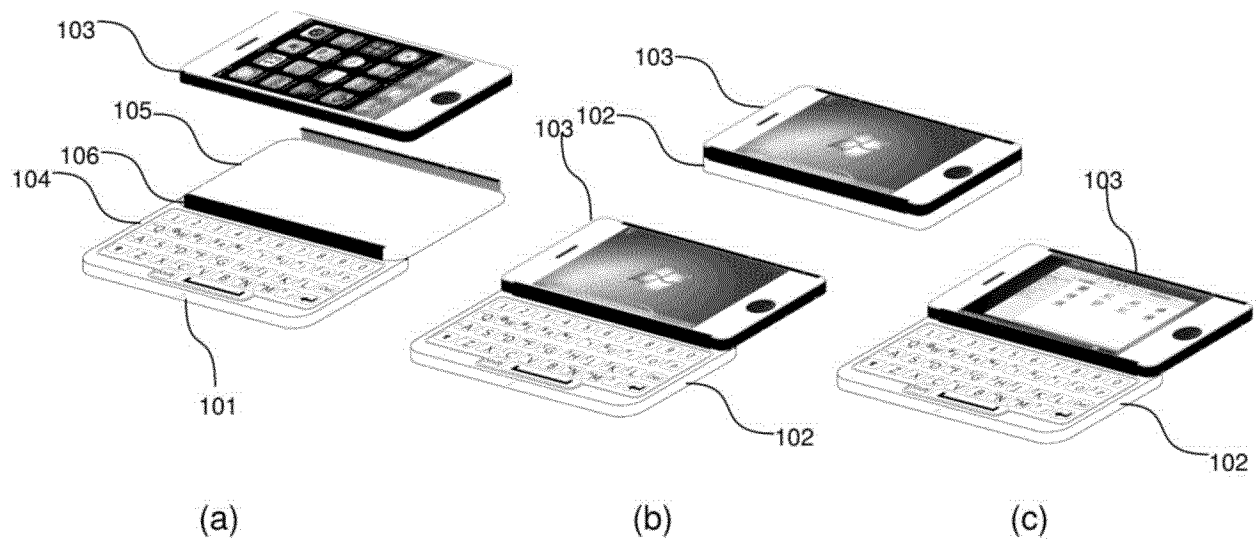

In the Drawings

Sheet 1 of 8 replace FIGS. 1 and 2 with attached page

Sheet 2 of 8 replace FIGS. 3 and 4 with attached page

Sheet 7 of 8 replace FIGS. 14 and 15 with attached page

Signed and Sealed this  
Ninth Day of July, 2019

Andrei Iancu  
*Director of the United States Patent and Trademark Office*

CERTIFICATE OF CORRECTION (continued)
U.S. Pat. No. 9,674,336 B2

In the Specification

Column 3, Line 13, please change "its" to --it's--

Colum 10, Line 48, please change "server" to --Server--

Column 11, Line 11, please change "bidden" to --hidden--

In the Claims

Column 14, Line 61, please change "unit" to --unit add-on--

(a)                  (b)                 (c)